Dec. 20, 1949     G. A. LYON     2,491,504
WHEEL COVER

Filed Dec. 16, 1944     4 Sheets-Sheet 1

Inventor
GEORGE ALBERT LYON.
by The Firm of Charles W. Hill Attys.

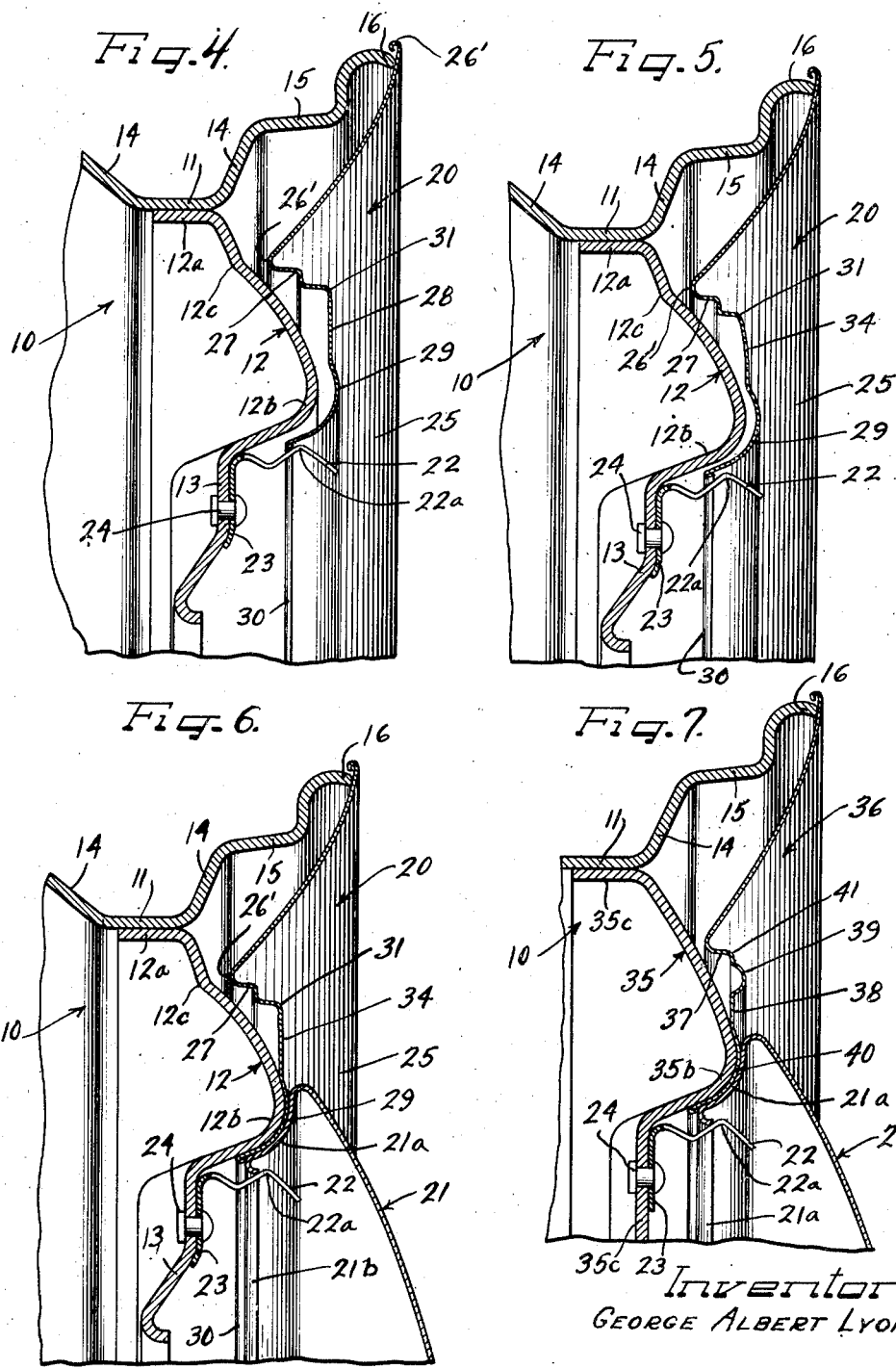

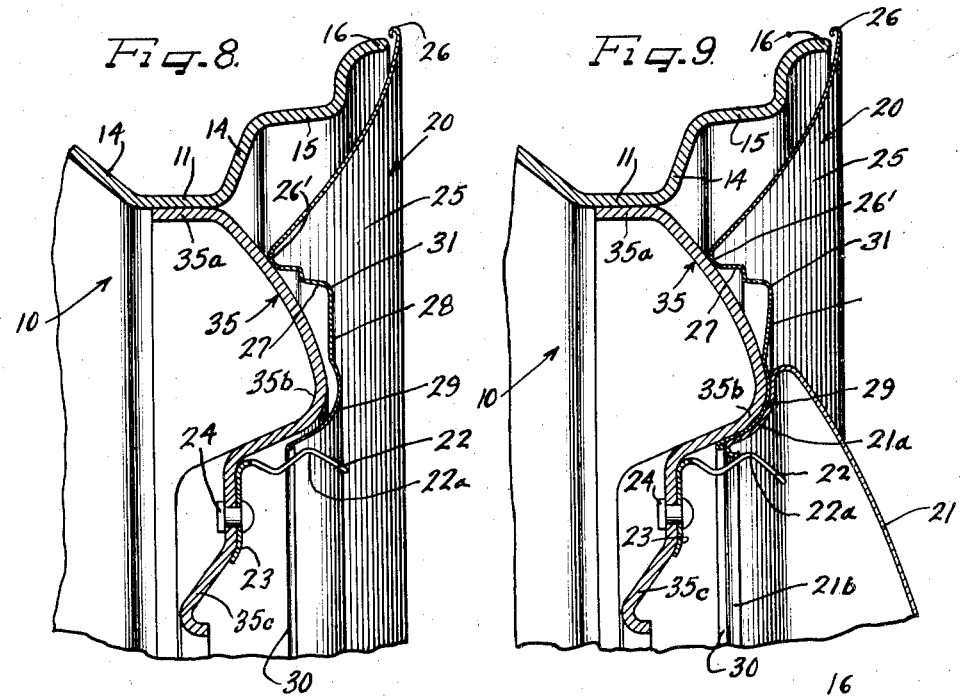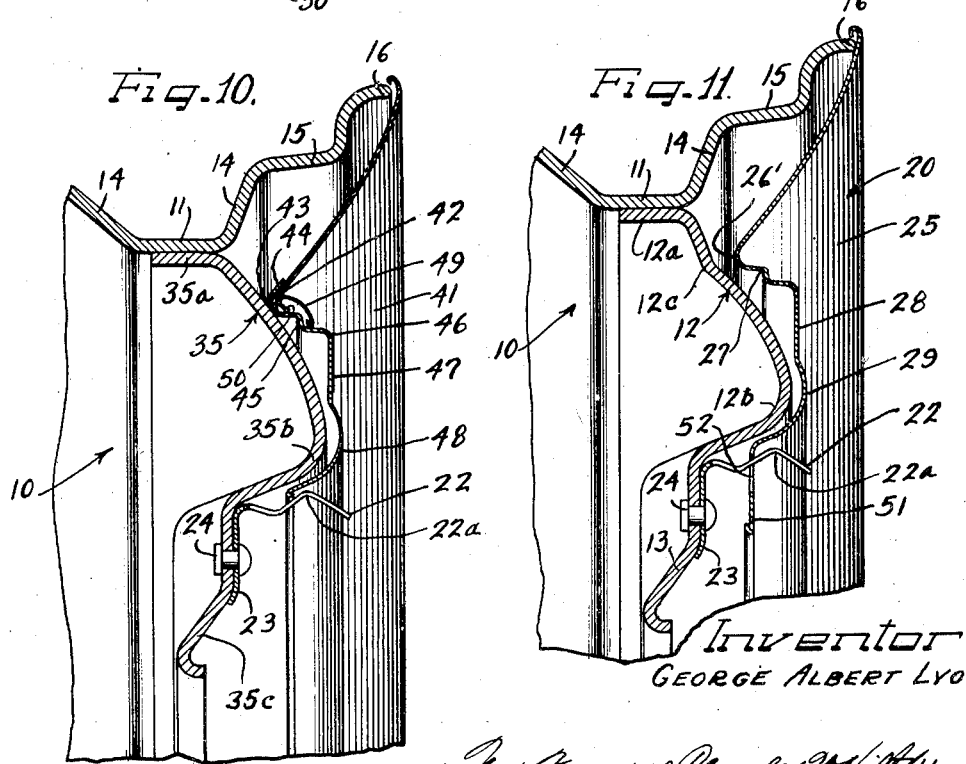

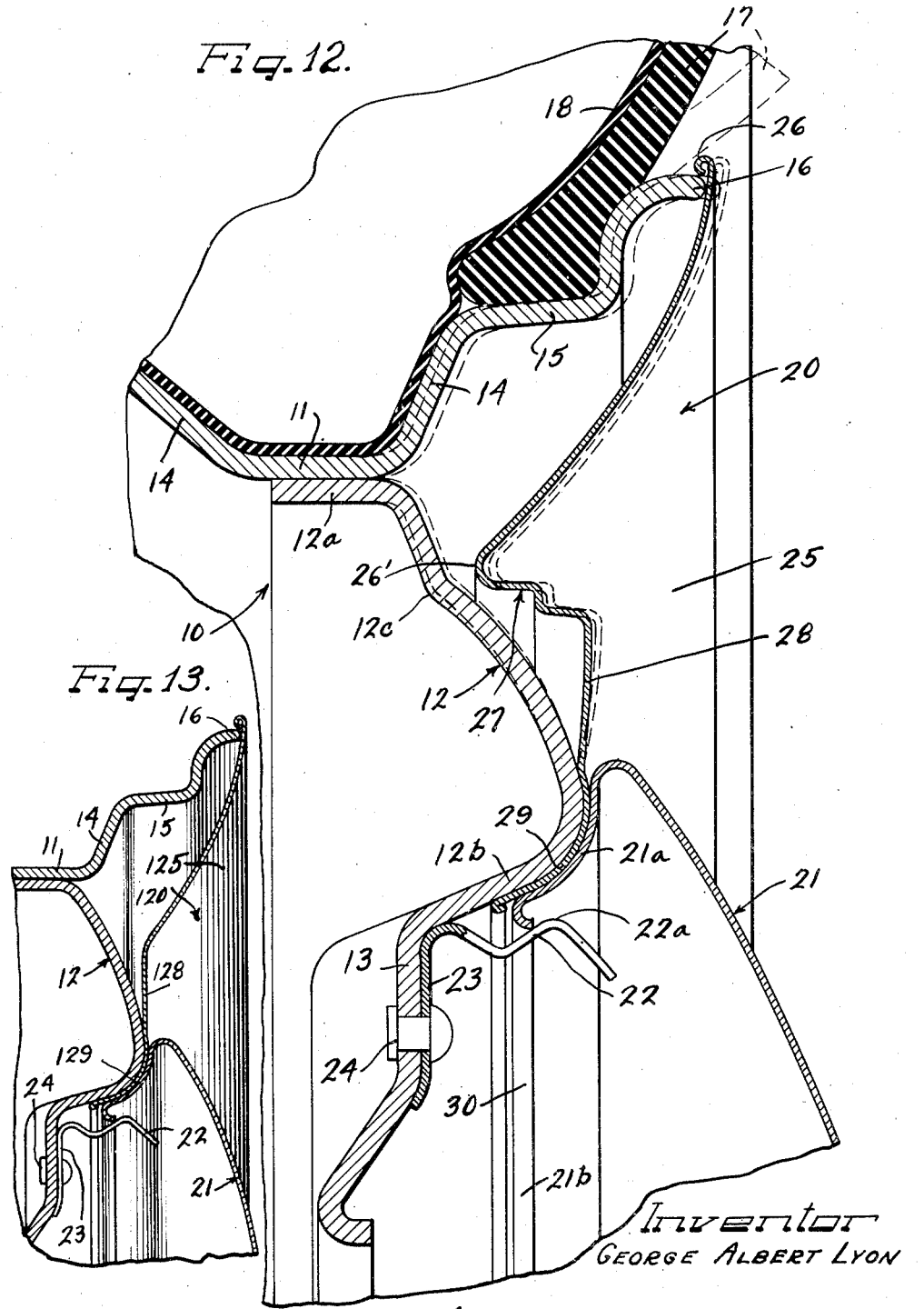

Patented Dec. 20, 1949

2,491,504

UNITED STATES PATENT OFFICE 2,491,504

WHEEL COVER

George Albert Lyon, Allenhurst, N. J.

Application December 16, 1944, Serial No. 568,411

6 Claims. (Cl. 301—37)

1

This invention relates to an improved wheel structure and is directed more particularly to an improved multi-part cover assembly therefor.

It is an object of the present invention to provide an improved retaining arrangement whereby a multi-part cover assembly may be secured to an associated wheel structure in a more efficient manner.

In the use of automobile wheel covers or discs of the type adapted to be held on a wheel by a hub cap snapped into retaining engagement with spring clips on the wheel, I have found that there is a marked tendency for the cap to be ejected from the wheel due to the clamped portion of the disc-like cover being held under tension. This tendency is further augmented when the wheel goes around the corner since buckling or distortion of any of the wheel parts due to the side play tends to cock the hub cap thereby enabling the spring clips to become more effective in the tendency to force the hub cap off the wheel. As a consequence, where such discs are used, it has been observed that hub caps are frequently lost on the roads and highways.

It is an object of this invention to provide an improved annular type of wheel cover structure adapted to be retainingly clamped on a wheel by a hub cap, but wherein an intermediate flexing zone is provided for accommodating these stresses and strains incident to the application of the cover structure to the wheel as well as in the use of the structure on the wheel whereby there is less of a tendency for the spring clips to eject the hub cap.

Still another object of this invention is to provide an improved wheel cover embracing a plurality of concentric sections including an intermediate substantially flattened section which defines a flexing zone in the cover.

In accordance with the features of the present invention there is provided in a wheel structure having a tire rim and a central load bearing portion, an improved cover assembly including an outer annular part provided with a radially outer edge arranged to extend to the vicinity of the edge portion of the tire rim and then to extend radially inwardly beyond the junction of the tire rim and the central load bearing portion in the vicinity of resilient retaining members attached to the wheel, there being a second cover member adapted to simulate a hub cap having a portion arranged to engage with said retaining means and to engage the radially inner margin of said annular cover member to press the same against the wheel in retained engagement there-

2 with, said annular cover member being formed at a radially inward part whereby that part only is subject to stress when the hub cap member is pressed axially inwardly thereagainst by the retaining means on the wheel.

Another feature of the present invention relates to the provision of a multi-part cover assembly for disposition over the outer side of a wheel which includes a radially outer annular cover part having a radially inner margin for engaging over retaining means on the wheel whereby it may be positioned relative to the wheel for assembly purposes and also including a central circular hub cap simulating cover part also arranged to retainingly engage the retaining means on the wheel to be urged axially inwardly by said retaining means into retaining engagement with the radially inner margin of the first cover part, whereby said first cover part may be preliminarily placed upon the wheel and will be there held without manual engagement by the user to permit manipulation of the hub cap simulating cover parts during the assembly operation.

Other features of the present invention relate to the provision in a multi-part cover assembly for disposition over the outer side of a wheel, of a radially outer, annular part arranged to be secured to the wheel by a second cover part under a condition of stress, said annular cover having a radially outer dished portion, preferably of convex-concave configuration to substantially simulate the side wall of a tire in a wheel with which it is associated, the radially inner margin of said dished portion constituting a relatively sharp bend merging into a stiffened, generally axially outwardly extending flange, the latter in turn merging into a generally radially inwardly extending flange, the latter being arranged to be flexed axially inwardly by a second cover member as the annular cover member is held on the wheel thereby, this arrangement causing the radially outer cover member to hug the wheel parts engaged thereby and yet distributing the stresses which cause this hugging relationship to afford a minimum axial outward stress against the means utilized to maintain the stress condition and hold the annular cover parts on the wheel. In one form of the invention shown herein, this radially inwardly extending flange is formed initially flat and is curved slightly inwardly when placed under stress during attachment of the cover parts to the wheel, the point of flexure being at the radially outer extremity of the flat flange. In another form of the invention the said flange is initially formed to curve slightly axially outwardly, whereupon it is flexed into a flat condition during attachment of the cover part to the wheel. In a third form of the invention shown herein the flange is provided with a bead whereby it is reinforced, hereagain the attaching flexure taking place at the radially outer extremity of the beaded flange.

It is another important feature of the present invention to provide a multi-part cover assembly of the above character which may be adapted to fit snugly against wheel structures having different dimensions, that is, for instance, tire rims which extend different distances axially outwardly, the cover accommodating these different dimensions due to the resiliency thereof and being held onto the wheel in stressed relation in an improved manner by virtue of the present invention.

In accordance with still another form of my invention, there is provided herein a multi-part cover assembly which includes a separate radially outer annular plastic cover member of convex-concave, dished configuration arranged to overlie the outer side of the tire rim of a wheel and to extend radially inwardly and axially inwardly to a point on the central load bearing portion of the wheel, the inner edge thereof being nested in a curved portion of an intermediate, annular, more rigid cover part provided with an axially outwardly extending portion and a generally radially inwardly extending flange portion having the characteristics of the deflectable radially inwardly extending flange portion set forth above. In this construction the plastic cover part entirely conceals the tire rim and substantially simulates the curvature of the side wall of a tire to give the appearance of being a continuation thereof and at the same time is locally flexible, whereby appurtenances therebehind may be rendered accessible merely by locally flexing the appropriate portion of the radially outer edge of the plastic cover member.

Many other objects and features of the invention will become apparent from the following description and accompanying drawings, in which Figure 1 is a side elevational view of a wheel structure embodying one form of my invention;

Figure 4 is a fragmentary, enlarged cross-sectional view of the structure of Figures 1, 2 and 3, partially assembled with a wheel structure of varying dimensions;

Figure 5 is a fragmentary, enlarged cross-sectional view of a modified form of the invention shown in Figures 1, 2, 3 and 4, the parts being partially assembled on the wheel;

Figure 6 is a fragmentary cross-sectional view similar to Figure 5 showing the structure of Figure 5 completely assembled upon the wheel;

Figure 7 is a fragmentary enlarged cross-sectional view of a still further modified form of the invention;

Figure 8 is a fragmentary enlarged cross-sectional view of still another form of the invention;

Figure 9 is a view similar to Figure 8 showing the parts of this form of the invention completely assembled upon the wheel;

Figure 10 is an enlarged fragmentary cross-sectional view of still another form of the invention partially attached to the wheel;

Figure 11 is an enlarged fragmentary cross-sectional view of a further modified form of my invention;

Figure 12 is an enlarged fragmentary sectional view similar to Figure 2, with the bead omitted and showing by dotted lines what occurs in the cover assembly when the wheel is distorted as in going around a corner; and Figure 13 is a fragmentary sectional view similar to Figure 2 of a further modification.

It is to be understood that the embodiments shown herein are for illustrative purposes and may be changed or modified without departing from the spirit and scope of the invention as set forth in the appended claims.

Figure 2:
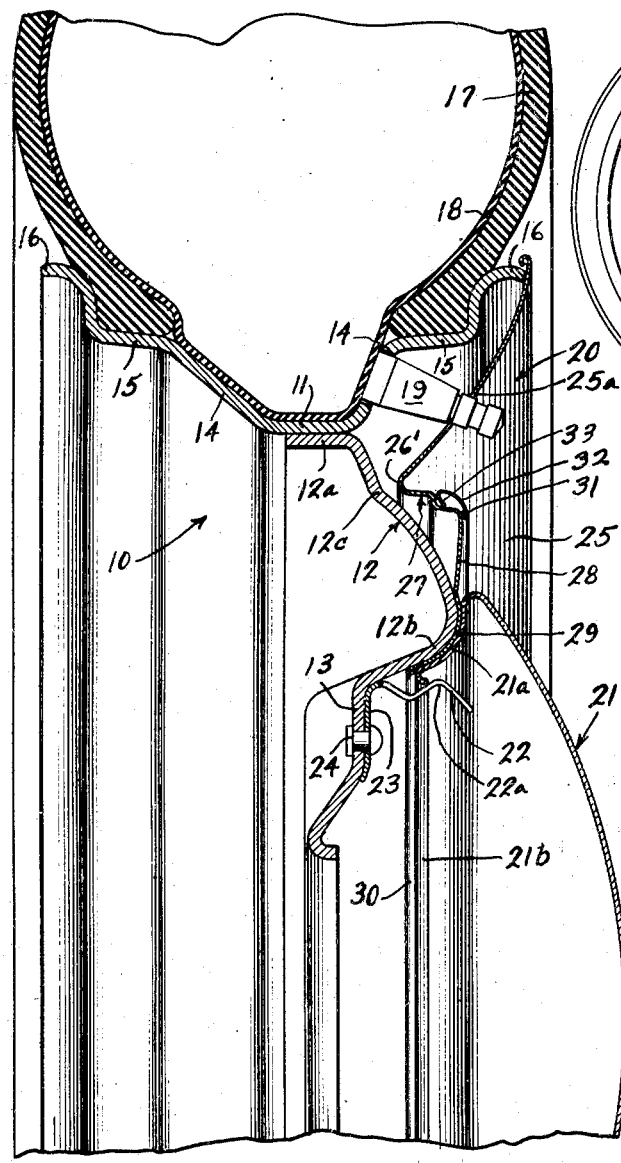
Figure 2 is a fragmentary enlarged cross-sectional view taken on the line II—II of Figure 1.

As shown in Figure 2 the reference character 10 designates generally a multi-flange, drop center type tire rim which is connected as by riveting or welding or the like through the base flange 11 to a central body part or spider 12 having an axially inwardly extending skirt or flange 12a.

The drop center rim 10 is further provided with opposite side flanges 14, opposite intermediate flanges 15 and opposite edge portions 16. A tire 17 having an inner tube 18 and a valve stem 19 is mounted upon the rim, one of the side walls 14 having an orifice through which the valve 19 may project. Disposed inwardly and preferably integrally on the central load bearing portion 12 is a bolt-on flange 13 by means of which the wheel may be secured to a portion of a vehicle such as a brake drum or the like.

Figure 1:
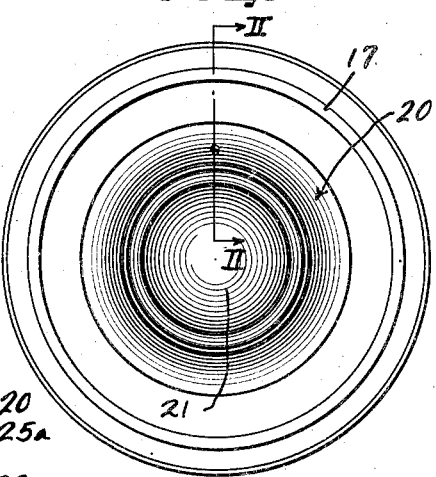
Figure 3:
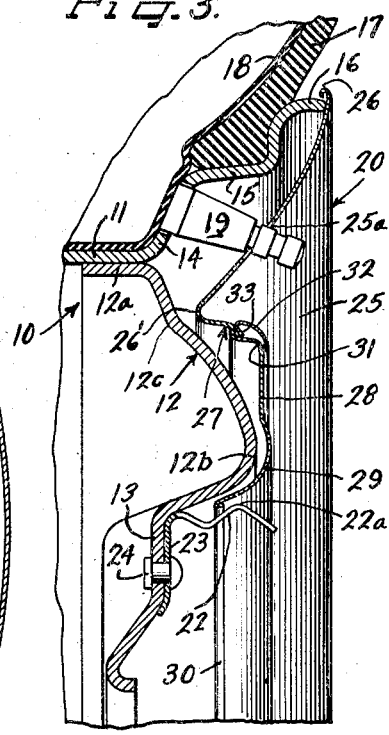
Figure 3 is a fragmentary cross-sectional view similar to Figure 2 showing certain of the parts thereof in the position assumed at an intermediate point of the cover assemblying operation.

The assembly shown in Figures 1, 2 and 3 includes a radially outer annular cover member 20 and a central hub cap simulating cover member 21 both of which, as will be seen presently, may be attached to the wheel by means of resilient spring clips 22, forming axially outward resilient extensions from an annulus 23 riveted to the bolt-on flange 13 of the wheel as shown at 24.

As will best be seen from Figure 3 the annular cover member 20 includes an outer concave-convex dished portion or section 25 terminating at its radially outer edge in an axially inwardly curled lip 26 which extends around the outermost part of the edge portion 16 of the tire rim 10. The portion 25 is provided with an aperture 25a through which the outer end of the valve stem may extend to be accessible for inflating the tire.

This dished portion 25 of the annular cover member 20 extends radially inwardly and axially inwardly of the wheel to a point beyond the junction of the tire rim 10 and the central load bearing portion or spider 12 where it is provided with an axially outwardly opening groove 26' which serves as the junction between the dished portion 25 and a generally axially outwardly extending intermediate stepped flange or section 27, the latter terminating in a generally radially inwardly extending flat flange 28. This intermediate section or flange 28 constitutes a diaphragm and defines an intermediate flexing zone for the cover or wheel disc.

The flange 28 in turn merges with a curved portion or inner section 29 which is circular to substantially conform to the configuration of the circular protuberance 12b on the central load bearing portion or spider 12 of the wheel. The curved circular portion 29 of the cover member 20 terminates radially inwardly in a bead 30 which is arranged to be pressed over, in cam relationship thereto, the circularly arranged resilient spring clips 22, each of which has a peak portion 22a that defines a circle slightly larger than that defined by the bead 30. Thus, when the cover member 20 is cammed over the resilient clips 22 until the radially outer edge thereof abuts the outermost part of the edge portion 16 of the tire rim, it will be seen that the flange 26 and the curved portion 29 are disposed in a position spaced from adjacent portions of the wheel. This retention of the cover member 20 in this position by means of the spring clips 22 enables the operator to freely manipulate the cover member 21 in the manner to be explained presently since he need not hold the cover member 20 in position during the remainder of the cover assembling operation.

The concentric radially inner and outer cover sections 25 and 26 are relatively rigid in comparison to the intermediate diaphragm section comprising portions 27 and 28. Hence, relative axial inward movement of the inner section 26, relative to the outer section 25 of the cover, effects flexure of the diaphragm section with a movement which may be substantially likened to that of an oil can bottom.

After the cover member 20 has been positioned as shown in Figure 3, the circular cover member 21 which is provided with a curvate, generally radially inwardly, generally axially inwardly extending flange 21a terminating in a curled lip 21b is urged axially inwardly against the curved portion 29 of the cover 20 and over the respective spring clips 22 whereby the latter are cammed inwardly until the bead 21b passes over the peaks 22a of the clips. The spring clips then move resiliently outwardly to force the hub cap simulating cover member 21 tightly inwardly toward the circular portion 12b of the wheel to move the adjacent portion of the cover 20 axially inwardly thereagainst.

It will thus be seen that the cover member 20 has been placed under a condition of stress by flexure of the radially inner portion thereof when the cover 21 is urged into the position shown in Figure 2. In the past this flexure of the cover has involved generally the entire cross-section thereof whereby a high degree of stress is attained and during use of the vehicle and particularly upon excessive vibration thereof on rough roads and the like, it has been found that this considerable stress developed in the outer cover had resulted in the hub cap portion 21 being moved axially outwardly of the resilient retaining members such as the spring clips 22 with the result that this portion is lost and in all probability the radially outer cover is also lost.

With the above described construction however the stepped flange 27 of the cover member 20 is considerably reinforced by the configuration thereof with the result that flexure of the radially inner part of the cover 20 takes place about the curved integral junction 31 between the stepped flange 27 and the flat radially inwardly extending flange 28. Under these conditions the cover 20 is placed under a condition of stress sufficient to prevent it from vibrating on the wheel and developing rattle while, at the same time, the tendency of the radially inner part thereof to spring outwardly into the normal configuration shown in Figure 3 is minimized to such a degree that these axially outwardly imposed forces are insufficient to accidentally spring the cover 21 from the position shown in Figure 2.

From the foregoing it will be seen that with the above described construction the entire cover member 20 is urged bodily inwardly against the wheel while at the same time the distortion thereof which causes this condition is limited to parts of the cover 20 disposed radially inwardly of the integral curved junction 31 between the stepped flange 27 and the flat flange 28.

If desired the cover may be further ornamented by the provision of an annular trim ring 32 having a radially outer edge turned back and bent generally radially inwardly and axially outwardly to provide biting engagement of the edge thereof as at 33 with one of the steps of the flange 27.

Referring to Figure 4 the wheel there shown is structurally identical to that shown in Figures 1, 2 and 3 except that in the construction of Figure 4 the tire rim is provided with slightly different radial and axial dimensions but still within the rather broad tolerance limits maintained in the construction of wheel parts. Likewise the cover member 20 of Figure 4 is identical to that shown and described in conjunction with Figures 1, 2 and 3.

In Figure 4 the cover member 20 is shown in the partially assembled position it assumes immediately prior to attachment of an associated central hub cap simulating cover member. It will be seen that in this position the radially outer part of the cover again abuts the off-side tire rim while the radially inner part again is spaced from the central load bearing portion 12 of the wheel. Thus it will be seen that when a central cover member is applied as shown in Figure 2, the cover 20 will be pressed into a position on the wheel substantially similar to that shown in Figure 2 in spite of the different dimensions of the wheel parts.

Referring to Figure 5 the wheel there shown is identical to that described in conjunction with Figures 1, 2 and 3 and the various parts of the radially outer cover member 20 are the same as those of the radially outer cover shown in Figures 1, 2 and 3 with the exception that the radially inwardly extending flange 34 is curved to a slight degree as distinguished from the flat flange 28 previously described. As will be seen from Figure 5 the curved portion 29 of the cover there shown is in such a position that when the central cover member 21 is disposed thereover as shown in Figure 6 this curved portion 29 engages the circular protuberance 12b of the central load bearing portion 12 of the wheel to be cammed radially inwardly thereby with the result that the previously curved portion 34 assumes a flattened condition as shown in Figure 6. Here again distortion stresses are taken up by the flange 34 rather than throughout the entire cross-sectional depth of the cover member 20.

In the construction of Figure 7 the wheel shown is similar to those described above except that the central load bearing portion 35 offers a continuous, undepressed outer surface at the radially outer protruding part thereof. In the forms of my invention heretofore described the circular depression shown at 12c permits the double stepped portion 27 to be formed in the cover. However, in the wheel construction of Figure 7, where this circular depression is not present, the cover 36 may include a single stepped flange 37 which merges into a radially inwardly extending flange 38 that may be provided, if desired, with a circular, concentric rim 39. The flange 38 terminates radially inwardly as in the previous constructions in a curved portion 40 which is arranged to be pressingly fitted around the circular protuberance 35b of the wheel when the central hub cap member 21 is pressed into the position shown over the spring clip members 22.

The operation of the various parts of the cover 36 in the construction of Figure 7 is substantially similar to that described in conjunction with Figures 1, 2 and 3 in that upon application of the cover member 21 thereover a flange 38 of the cover member 36 flexes about the angular junction 41 disposed between the flange 37 and the flange 38.

In the construction of Figures 8 and 9 the wheel is identical to that shown in Figure 7 and the parts are thus accordingly so indicated. The cover of Figures 8 and 9, on the other hand, is identical to that shown in Figures 1, 2 and 3 and the parts are so indicated.

With this arrangement it will be seen that while the wheel is of the type not having the circular depression 12c in the central load bearing portion thereof the cover is of the type having the double stepped portion 27 extending in a substantially axial direction. Under these circumstances it will be seen that the curved portion 26 of the cover member 20 abuts the outer surface of the central load bearing portion 35 of the wheel whereby the radial outer extremity thereof as shown at 26 is disposed in spaced relationship from the axially outer extremity of the edge portion 16 of the tire rim 10. When the central cover member 21 is assembled on the wheel as shown in Figure 9, it will be seen that the flange 28 flexes appreciably about the circular junction 31 thereof with the double stepped flange 27.

During this action of the cover parts it will be seen that the curved portion 26 of the cover member 20 is disposed in abutting relationship with the central load bearing portion 35 of the wheel, which abutment isolates the radially outer part 25 of the cover from the distorting pressures imposed by the cover 21. This has been found to provide a desirable assembly having the attributes set forth above.

The form of my invention shown in Figure 10 is admirably adapted to utilize the principles of the present invention in conjunction with a cover member constructed from synthetic plastic material or the like.

In the form of this invention shown in Figure 10 the cover assembly includes a radially outer annular cover part 41 formed from sheet synthetic plastic material and having a cross-sectional expanse whereby it extends from its radially outer edge which is in the vicinity of the edge portion 16 of the tire rim radially inwardly and axially inwardly with a gradual curved sweep to a point on the central load bearing portion 35 of the wheel disposed radially inwardly of the junction of the load bearing portion 35 and the tire rim. The radially inner margin of the annular cover part 41 is provided with a slight axial outward curvature as at 42, this curved portion being arranged to fit within a curved portion 43 of an annular cover part which is provided with a radially outer margin comprising a backing flange 44 connected with a generally axially outwardly extending stepped flange 45 by means of the curvate portion 43. The stepped flange 45 terminates axially outwardly in a circular edge portion 46 which in turn merges with a radially inwardly extending flange 47 similar to the flange 28 of the form of the invention shown in Figures 1, 2 and 3. The flange 47 in turn merges with a curved portion 48, the radially inner margin of which fits over the clips 22 in a manner described previously in conjunction with the other forms of the invention. To the end that the radially inner margin of the plastic cover member 41 may be securely held against the more rigid backing flange 44, there is provided an annular ornamental bead member 49 having a bent back edge 50 which bitingly engages the adjacent portion of the stepped flange 45. From Figure 10 it will be seen that when the trim member 49 is in its ultimate position the radially outer portion thereof presses the cover 41 against the flange 44.

The association of the foregoing cover construction with a suitable central circular hub cap simulating cover member is essentially similar to that of the construction shown in Figures 1, 2 and 3 in that the flange 47 and the curved portion 48 flexes about the circular portion 46.

With the foregoing construction it will be seen that the radially outer part of the cover may be subjected to a condition of stress when pressed onto the wheel by the central cover and yet the radially outer part thereof, that is, the plastic portion, will not be subjected to excessive strain. Rather, the distorting forces are applied to the flange 47 about the circular curved portion 46 and the plastic cover portion 41 is isolated from these distorting influences by means of the abutment between the curved portion 43 of the cover assembly and the outer surface of the central load bearing portion 35 of the wheel.

The construction of Figure 11 is substantially like that shown in Figures 1 and 2 except that in the construction of Figure 11 the radially inner margin of the cover member 20 extends radially inwardly a greater distance to a point inwardly of the resilient clips 22, there being apertures 52 aligned with the circumferentially spaced clips 22 to receive the same.

In Figure 12 I have illustrated an enlargement of the structure shown in Figure 2 with the exception that the ornamental bead or ring 39 has been omitted. This structure corresponds identically with what is shown in Figure 2 and I employ the same reference characters in Figure 12 to illustrate parts which are common to both Figures 2 and 12.

The dotted lines shown in Figure 12 indicates the deflection that occurs in the wheel and in the cover, when for example the wheel is going around a corner. While the showing is somewhat diagrammatic, it nevertheless roughly illustrates the conditions that must be met incident to the operation of an automobile wheel, particularly when that wheel is stressed by a sharp turn around a corner or the like.

It will be noted that the tire 17 is deflected or distorted out of its normal shape and that the pressure is such as to cause a substantial amount of deflection or distortion in the flanges 14, 15 and 16 of the rim. Also, the wheel body or load bearing member 12 is deflected.

It will, of course, be appreciated that the amount of deflection is progressively lessened in the direction of the axis of the wheel due to the fact that the leverage becomes less as the center is approached.

Now it is clear that inasmuch as there is relative movement under the circumstances noted above between the rim and body members of the wheel, this movement must also be accommodated in the cover. It will be perceived that the outer ring section 20 of the cover is bodily deflected axially and radially outwardly and that this bodily movement of the section 20 is permitted by reason of the flexing afforded in the intermediate flattened or stepped section 27—28 of the cover. Due to the diaphragm like action of this intermediate section the center clamped portion or section 29 of the cover is substantially relieved of stress which would tend to cock the hub cap and loosen it from its retained cooperation with the spring clips 22.

Thus there is provided in various wheel discs or covers of this invention, an intermediate diaphragm or flexing zone in the cover which not only functions in the applicaton of the cover to the wheel, but also is operative in the use of the cover on the wheel to prevent undue stressing of the spring clips which would tend to dislodge the hub cap from its retaining cooperation with the wheel disc. It will be appreciated that in the application of the cover to the wheel the intermediate diaphragm section such as the section 28 which is substantially flattened, is stressed by reason of the deflection or movement of the inner curved section 29 into tight cooperation with the nose of the wheel body or load bearing part. On the other hand, during the use of the cover on the wheel, it is the displacement bodily of the outer section 25 which flexes the intermediate flattened section 28. Accordingly this intermediate flexing section is responsive to movement of either of the outer or innermost sections of the cover or disc. I find that this intermediate section can flex in response to relatively little or soft pressure and will thus flex before any force can be applied to distort or flex the inner and outer radial sections of the cover.

In all forms the intermediate section or flexing zone of the cover enables the cover to accommodate readily allowable manufacturing tolerances on the wheel rim and body parts.

In Figure 13, I have illustrated a modification of wheel cover or disc which is designated generally by the reference character 120, and inasmuch as the wheel structure with which it cooperates is substantially identical to that of the previously described form of the invention, I have employed the same reference numerals on the wheel structure as are common to the elements in the other figure.

The wheel cover 120 may be made of any suitable material as in the previous forms of the invention although excellent results may be had when it is made from steel sheets varying from .012 to .020 inch in thickness. Of course, the thicker the material the greater will be the stiffness of the disc and with the thickest material it is possible that the springs will have to be positioned slightly different than in the case of the thinner material in order to obtain the best retaining results.

In this form of the invention as in the previous forms, the cover is made up essentially of three sections; namely, a radially outer channeled section 125, an intermediate diaphragm section 128 defining the flexing zone, and a radially inner curved channeled section 129 for telescoping relation with the center part of the wheel body.

In this form of the invention instead of the diaphragm section 128 which defines the flexing zone being of a stepped construction, it is made from a flat section which extends directly from the channeled section 125 to the inner curved section 129 which is nested under the hub cap 21. It will be noted that this flat flexing section 128 is in a plane which substantially intersects the outer face of the wheel body member at the nose portion thereof.

The operation of this form of the invention is substantially the same as in the case of the previous form with flattened section 128 providing a flexing zone or area for the cover.

I claim as my invention:

1. In an annular cover for disposition at the outer side of a vehicle wheel, concentric inner and outer annular cover sections of relatively rigid formation, and an integral diaphragm section in one piece with said inner and outer sections and comprising a relatively flat radially extending annular portion and an axially extending juncture portion between the flattened portion and the radially inner part of the outer annular section of the cover and disposing the flattened portion and said inner annular section in substantially outwardly offset relation to the inner portion of the outer section, said flattened portion of the diaphragm section and the juncture thereof with the axially extending portion being resiliently flexible to flex for inward movement of the inner cover section relative to the outer cover section upon the application of relatively slight pressure inwardly against the inner cover section, said axially extending portion being of stepped formation and providing a pair of radially outwardly facing annular areas.

2. A cover as defined in claim 1 wherein a reinforcing bead annulus is carried by one of the radially facing areas of said axially extending portion.

3. As an article of manufacture, a wheel cover comprising: a circular inner cover portion adapted to be disposed opposite the outer side of a vehicle wheel body, a radially outer annular cover portion extending generally radially outwardly, and an intermediate integral connecting flange extending generally axially and of stepped formation offsetting said cover portions axially, said stepped formation including a pair of radially offset radially facing annular areas.

4. As an article of manufacture, a wheel cover comprising: a circular inner cover portion adapted to be disposed opposite the outer side of a vehicle wheel body, a radially outer annular cover portion extending generally radially outwardly, and an intermediate integral connecting flange extending generally axially and of stepped formation offsetting said cover portions axially, said stepped formation including a pair of radially offset radially facing annular areas, said circular inner cover portion including a generally flattened annular diaphragm area adjacent to said connecting flange and adapted to flex inwardly toward the wheel body upon the application of inward flexing pressure.

5. As an article of manufacture, a wheel cover comprising: a circular inner cover portion adapted to be disposed opposite the outer side of a vehicle wheel body, a radially outer annular cover portion extending generally radially outwardly, and an intermediate integral connecting flange extending generally axially and of stepped formation offsetting said cover portions axially, said stepped formation including a pair of radially offset radially facing annular areas, said circular inner cover portion comprising an inner marginal area of convex cross-section for directly engaging against the wheel body and a section intermediate said convex section and said flange comprising a flattened diaphragm flexible in an axial direction.

6. As an article of manufacture, a wheel cover comprising: a circular inner cover portion adapted to be disposed opposite the outer side of a vehicle wheel body, a radially outer annular cover portion extending generally radially outwardly, and an intermediate integral connecting flange extending generally axially and of stepped formation offsetting said cover portions axially, said stepped formation including a pair of radially offset radially facing annular areas, said circular inner cover portion having a radially inner extension including a plurality of apertures through which retaining clips on the wheel body are adapted to extend.

GEORGE ALBERT LYON.

REFERENCES CITED

The following references are of record in the file of this patent:

UNITED STATES PATENTS

| Number | Name | Date |
|---|---|---|
| Re. 21,179 | Lyon | Aug. 22, 1939 |
| Re. 22,120 | Lyon | June 16, 1942 |
| 1,948,273 | Lyon | Feb. 20, 1934 |
| 1,980,690 | Lyon | Nov. 13, 1934 |
| 2,022,128 | Lyon | Nov. 26, 1935 |
| 2,166,216 | Lyon | July 18, 1939 |
| 2,298,669 | Wood | Oct. 13, 1942 |
| 2,304,583 | Lyon | Dec. 8, 1942 |
| 2,333,626 | Aske | Nov. 9, 1943 |
| 2,368,232 | Aske | Jan. 30, 1945 |